April 30, 1957 W. B. RAHN ET AL 2,790,584
GAME CARRIER ATTACHMENT FOR AUTOMOBILES
Filed April 20, 1956

INVENTOR.
JAMES L. RAHN
BY WILBUR B. RAHN

McMorrow, Berman + Davidson
ATTORNEYS

2,790,584

GAME CARRIER ATTACHMENT FOR AUTOMOBILES

Wilbur B. Rahn and James L. Rahn, Norwich, N. Y.

Application April 20, 1956, Serial No. 579,676

4 Claims. (Cl. 224—42.31)

This invention relates generally to game carriers, and more particularly has reference to a game carrier adapted for attachment to an automobile, for the purpose of carrying large game animals, such as deer.

Heretofore, the carrying of deer and other large animals on automobiles has presented a serious problem. Automobiles of modern design have hoods and fenders so shaped that it is difficult to find a line of demarcation therebetween, there being no substantial indentation between a fender and the adjacent side of the hood, as was true of automobiles of older design. It has been the practice to sling a deer over an automobile fender adjacent the hood, in the indentation between the fender and hood, but this is difficult in an automobile of modern design. Accordingly, since later model cars have very little fender space to accommodate the transportation of the deer from the hunting area to the hunters' homes or other destinations, it has been necessary to tie the animal to the vehicle by make-shift means with ropes or straps fastened to doors, bumpers, etc. Not only does this practice measurably inhibit free access to the vehicle interior, but further, it has the disadvantage that the deer often is not securely held in position and may slip, particularly when the vehicle is traveling at relatively high speeds or over rough roads.

In view of the above, the broad object of the present invention is to provide a vehicle attachment having the general characteristics of a sling, which attachment is particularly adapted to facilitate the transportation of large game animals such as deer.

Summarized briefly, the device conceived to accomplish the above stated broad purpose comprises a main strap adapted to extend from side to side of the vehicle, said strap being adjustable as to length and having hook means at opposite ends thereof engageable under the edges of the front fenders of the vehicle. Connected to one end portion of said strap is a mat of flexible material, on which the game animal is positioned, so that there will be no damage to the finish of the vehicle. Overlying the mat are auxiliary straps, converging to a meeting point at which they are connected to the main strap and to the inner side edge of the mat. The auxiliary straps are adapted to be looped about the animal, and are associated with buckle elements so as to permit the straps to be tightened adjustably when so looped. Adjacent the outer side edge of the mat, the auxiliary straps pass through ties, which hold the auxiliary straps in desired angular relationship to one another whereby they will be held against slippage longitudinally of the game animal. Further, the ties cause the mat to be raised protectively at its outer side edge into protective relationship to the hide of the animal. The design is such as to permit a second deer sling to be used on the same vehicle for transporting two, rather than one, deer and in fact the auxiliary strap assembly can be provided at both ends of a single main strap for accomplishing this desirable purpose.

Among more specific objects of the invention are the following:

To provide an attachment of the type stated which will be swiftly connectable to any of various makes or models of automobiles, without requiring modification or redesign either of the vehicle or of the game carrier;

To permit manufacture of the game carrier at a cost sufficiently low as to make the same fully feasible from the standpoint of commercial production and sale;

To provide a game carrier the several components of which will be adjustable in such a manner as to permit the same to carry animals of different sizes;

To design the game carrier in such a manner as to permit its attachment to automobiles of modern design;

To form the game carrier attachment in a manner such as to facilitate not only its swift connection to the vehicle, but also to the game animal, with the construction being such as to facilitate to an equal extent the disconnection of the device from the animal and vehicle; and To form the game carrier in such a manner that it can be rolled or folded into a small, compact article when not in use.

Other objects will appear from the following description, the claims appended thereto, and from the annexed drawing, in which like reference characters designate like parts throughout the several views, and wherein:

Figure 1:
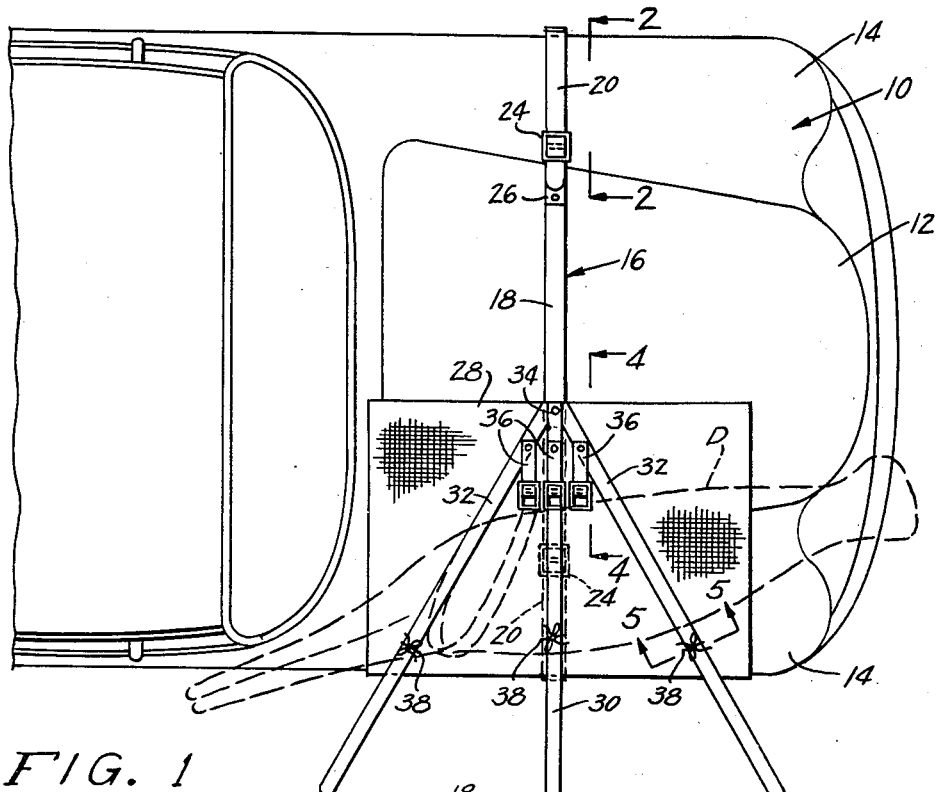
Figure 1 is a fragmentary top plan view of a vehicle equipped with a carrier formed according to the present invention, a game animal being shown in dotted lines, the auxiliary straps being in open position.

Referring to the drawings in detail, designated generally at 10 is an automobile of modern design, having a hood 12 merging at opposite sides thereof into fenders 14.

The device constituting the present invention has been generally designated at 16, and includes a main strap 18, which like the auxiliary straps to be described hereinafter, can be formed of leather, canvas, webbing, or other suitable flexible strap material.

Figure 2:
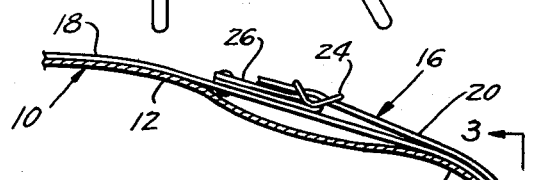
Figure 2 is an enlarged sectional view on line 2—2 of Figure 1, showing one end portion of the main strap.

The main strap 18 is of a length such as to permit it to extend across the full width of the vehicle as shown in Figure 1, and the opposite extremities of the main strap are foldable reversely into overlying relation to the body portion of the main strap to provide end loops 20 (Figure 2) from which depend hooks 22 adapted to engage under the outer edges of the fenders 14.

The free ends of the loops 20 are engageable in buckles 24 carried by buckle-carrying, short loops 26 riveted or otherwise fixedly secured to the body portion of the main strap.

In this way, it will be seen that the main strap is adjustable as to length, due to the provision of the buckles, and has the adaptability of being swiftly connectable to the vehicle by engagement of the hooks 22 under the fender edges and by the subsequent tightening of the loops 20.

One end portion of the main strap extends under a rectangular mat 28 of substantial size, formed of a flexible material such as canvas. The main strap extends transversely of the mat 28 as shown in Figure 1, medially between the opposite ends of the mat, following a path normal to the longitudinal center line of the mat in the preferred, illustrated embodiment of the invention. The mat 28 is adapted to overlie one of the fenders 14, so that a deer D or other game animal can be supported upon the mat without danger of scratching or otherwise damaging the finish of the automobile.

Overlying the mat are auxiliary straps, comprising an intermediate auxiliary strap 30 aligned longitudinally with the main strap. At opposite sides of the intermediate strap there are provided side auxiliary straps 32, extending in converging relation to each other and to the intermediate strap so as to meet at the inner side edge of the mat 28. At the meeting point of the several auxiliary straps a rivet 34 is extended therethrough and through the mat and main strap, to provide a connection between the several components.

Figure 4:
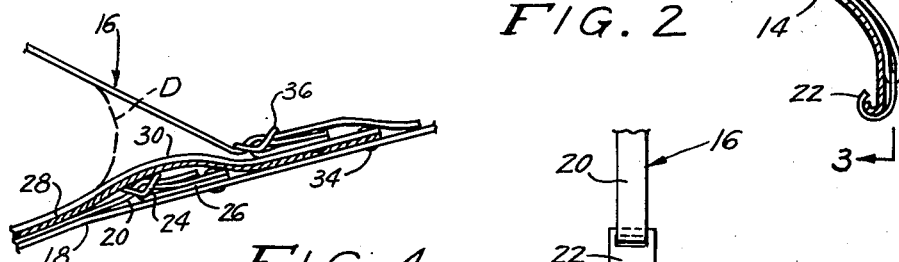
Figure 4 is an enlarged sectional view substantially on line 4—4 of Figure 1, in which the auxiliary strap has been looped about the deer.
Figure 3:
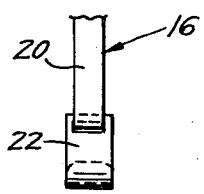
Figure 3 is a fragmentary elevational view, on the same scale as Figure 2, of the main strap end portion as seen from the line 3—3 of Figure 2.

The auxiliary straps have free ends which normally project beyond the outer side edge of the mat 28 as shown in Figure 1. These free ends are adapted, after passage of the auxiliary straps under the deer, to be looped over the deer as shown in Figure 4, and engaged in buckles carried by short tabs or loops 36 that are connected to the several auxiliary straps adjacent the point of convergence thereof.

Figure 5:
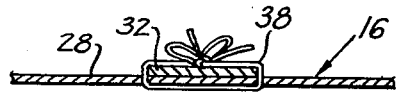
Figure 5 is a detail sectional view, the scale being enlarged still further, on line 5—5 of Figure 1, showing the connection of one of the auxiliary straps to the associated mat.

Adjacent the outer side edge of the mat 28, thongs or ties 38 are extended through the mat (see Figures 1 and 5), and are adapted to be tied in a bow or knotted over the several auxiliary straps. This anchors the auxiliary straps detachably to the mat, adjacent the outer side edge of the mat, thus maintaining the auxiliary straps in the desired angular relationship shown in Figure 1. The thongs can, however, be untied, to free the auxiliary straps from the outer side edge portion of the mat, should it be found convenient to meet the needs of the particular situation.

In use of the device, as previously noted the main strap is connected across the vehicle, and with the auxiliary straps open in the full line positions thereof shown in Figure 1 the deer is laid upon the mat. The deer or other animal will rest upon the auxiliary straps, after which the free end portions of said auxiliary straps are looped over the deer and connected to their associated buckles, with the loops now defined being adjustably tightened as desired.

The particular angular relationship of the several auxiliary straps, it may be noted, has a desirable characteristic during use of the device of preventing slippage of the animal in a longitudinal direction. This is due to the oblique disposition of the side auxiliary straps to the length of the animal, with said side straps being oppositely inclined relative to the length of the animal. The intermediate strap passes substantially normally to the length of the animal, and cooperate with the obliquely disposed side straps to prevent slippage.

The design of the carrier is such as to permit a second carrier to be attached in side by side relation to the first, to transport a second animal on the other fender 14. The second carrier would be simply disposed reversely to the first carrier, so as to locate its auxiliary strap and mat above the top fender, viewing the vehicle as in Figure 1.

It may even be possible, it is believed, to provide a double sling, wherein each of the two end portions of the single main strap 18 is provided with a mat and auxiliary strap means such as is shown in Figure 1.

Further, the device is not only designed to facilitate its adjustable connection to the vehicle and to the animal, but also, when not in use, can be swiftly removed and rolled or folded into a relatively compact bundle for storage.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A game carrier attachment for automobiles comprising: a main strap adapted to extend transversely of a vehicle with its end portions overlying opposite fenders of the vehicle, said main strap including means at its ends detachably engageable with the edges of the fenders; a thin, flexible mat disposed at one end of the strap so as to be located at one side of the vehicle in position overlying the fender at said side, the main strap at said end thereof extending across and being secured to the mat substantially medially between opposite edges of the mat leaving the mat free at opposite sides of the main strap, the portions of the mat at opposite sides of the strap extending substantial distances laterally from the main strap in opposite directions; and a plurality of hold-down straps, said hold-down straps being anchored at one end to the main strap and extending across the mat in diverging relation from the anchored ends thereof to support against the mat an animal to be carried.

2. A game carrier attachment for automobiles comprising: a main strap adapted to extend transversely of a vehicle with its end portions overlying opposite fenders of the vehicle, said main strap including means at its ends detachably engageable with the edges of the fenders; a thin, flexible mat disposed at one end of the strap so as to be located at one side of the vehicle in position overlying the fender at said side, the main strap at said end thereof extending across and being secured to the mat substantially medially between opposite edges of the mat leaving the mat free at opposite sides of the main strap, the portions of the mat at opposite sides of the strap extending substantial distances laterally from the main strap in opposite directions; and a plurality of hold-down straps, said hold-down straps being anchored at one end to the main strap and extending across the mat in diverging relation from the anchored ends thereof to support against the mat an animal to be carried, one of the hold-down straps being extended substantially in longitudinal alignment with the main strap, the other hold-down straps being disposed one at one side and one at the opposite side of the first named hold-down strap and being symmetrically disposed in respect to the first-named hold-down strap at acute angles thereto.

3. A game carrier attachment for automobiles comprising: a main strap adapted to extend transversely of a vehicle with its end portions overlying opposite fenders of the vehicle, said main strap including means at its ends detachably engageable with the edges of the fenders; a thin, flexible mat disposed at one end of the strap so as to be located at one side of the vehicle in position overlying the fender at said side, the main strap at said end thereof extending across and being secured to the mat substantially medially between opposite edges of the main strap, the portions of the mat at opposite sides of the strap extending substantial distances laterally from the main strap in opposite directions; and a plurality of hold-down straps, said hold-down straps being anchored at one end to the main strap and extending across the mat in diverging relation from the anchored ends thereof to support against the mat an animal to be carried, one of the hold-down straps being extended substantially in longitudinal alignment with the main strap, the other hold-down straps being disposed one at one side and one at the opposite side of the first named hold-down strap and being symmetrically disposed in respect to the first-named hold-down strap at acute angles thereto, said hold-down straps being anchored to the main strap a short distance inwardly from one side edge of the mat, the hold-down straps being anchored to the mat intermediate the ends of the hold-down straps, a short distance inwardly from the opposite side edge of the mat, at locations spaced along a line transverse of the main strap.

4. A game carrier attachment for automobiles comprising: a main strap adapted to extend transversely of a vehicle with its end portions overlying opposite fenders of the vehicle, said main strap including means at its ends detachably engageable with the edges of the fenders; a thin, flexible mat disposed at one end of the strap so as to be located at one side of the vehicle in position overlying the fender at said side, the main strap at said end thereof extending across and being secured to the mat substantially medially between opposite edges of the mat leaving the mat free at opposite sides of the main strap, the portions of the mat at opposite sides of the strap extending substantial distances laterally from the main strap in opposite directions; and a plurality of hold-down straps, said hold-down straps being anchored at one end to the main strap and extending across the mat in diverging relation from the anchored ends thereof to support against the mat an animal to be carried, one of the hold-down straps being extended substantially in longitudinal alignment with the main strap, the other hold-down straps being disposed one at one side and one at the opposite side of the first named hold-down strap and being symmetrically disposed in respect to the first-named hold-down strap at acute angles thereto, said hold-down straps being anchored to the main strap a short distance inwardly from one side edge of the mat, the hold-down straps being anchored to the mat intermediate the ends of the hold-down straps, a short distance inwardly from the opposite side edge of the mat, at locations spaced along a line transverse of the main strap, said hold-down straps including buckles adjacent said one end thereof, the other ends of the hold-down straps being free so as to be adapted to be looped about the supported animal and connected to said buckles.

References Cited in the file of this patent

UNITED STATES PATENTS

| | | |
|---|---|---|
| 2,409,946 | MacLeod | Oct. 22, 1946 |
| 2,696,360 | Toffolon | Dec. 7, 1954 |
| 2,753,095 | Barassi et al. | July 3, 1956 |